United States Patent
Biggi

(10) Patent No.: US 7,015,277 B2
(45) Date of Patent: Mar. 21, 2006

(54) ELASTOMERIC COMPOSITION COMPRISING A FUNCTIONALIZED ELASTOMER

(75) Inventor: Aroldo Biggi, deceased, late of San Donato Milanese (IT); by Orsola Casaburo, legal representative, San Donato Milanese (IT); by Silvia Biggi, legal representative, San Donato Milanese (IT)

(73) Assignee: Polimeri Europa S.p.A., Brindisi (IT)

( * ) Notice: Subject to any disclaimer, the term of this patent is extended or adjusted under 35 U.S.C. 154(b) by 44 days.

(21) Appl. No.: 10/416,167

(22) PCT Filed: Nov. 7, 2001

(86) PCT No.: PCT/EP01/13052

§ 371 (c)(1),
(2), (4) Date: Jan. 14, 2004

(87) PCT Pub. No.: WO02/40585

PCT Pub. Date: May 23, 2002

(65) Prior Publication Data

US 2004/0152822 A1    Aug. 5, 2004

(30) Foreign Application Priority Data

Nov. 16, 2000  (IT)  .......................... MI2000A2460

(51) Int. Cl.
*C08L 9/00* (2006.01)

(52) U.S. Cl. ...................................... 524/572; 524/576
(58) Field of Classification Search ................ 524/572, 524/576

See application file for complete search history.

(56) References Cited

U.S. PATENT DOCUMENTS

| 4,252,911 A | 2/1981 | Simon .......................... 525/53 |
| 4,281,085 A | 7/1981 | Ikeda et al. .................. 525/326 |
| 4,357,432 A | 11/1982 | Edwards ...................... 525/351 |
| 6,822,037 B1 * | 11/2004 | Schaal et al. ................ 524/492 |

FOREIGN PATENT DOCUMENTS

WO    00 37555    6/2000

* cited by examiner

*Primary Examiner*—Peter D. Mulcahy
(74) *Attorney, Agent, or Firm*—Oblon, Spivak, McClelland, Maier & Neustadt, P.C.

(57) ABSTRACT

An elastomeric composition vulcanizable with sulfur and/or sulfur donors useful for the preparation of tyres, which comprises: a) 100 parts of an elastomeric mixture comprising from 20 to 100% by weight, preferably from 60 to 100% by weight, of a functionalized elastomer (a1), from 0 to 80% by weight of a non-functionalized elastomer (a2) selected from monovinylarene-conjugated diene statistic copolymers, natural rubber, polybutadiene: b) from 10 to 150 parts of silica per 100 parts of (a); c) from 0 to 150 parts of carbon black per 100 parts of (a).

18 Claims, 1 Drawing Sheet

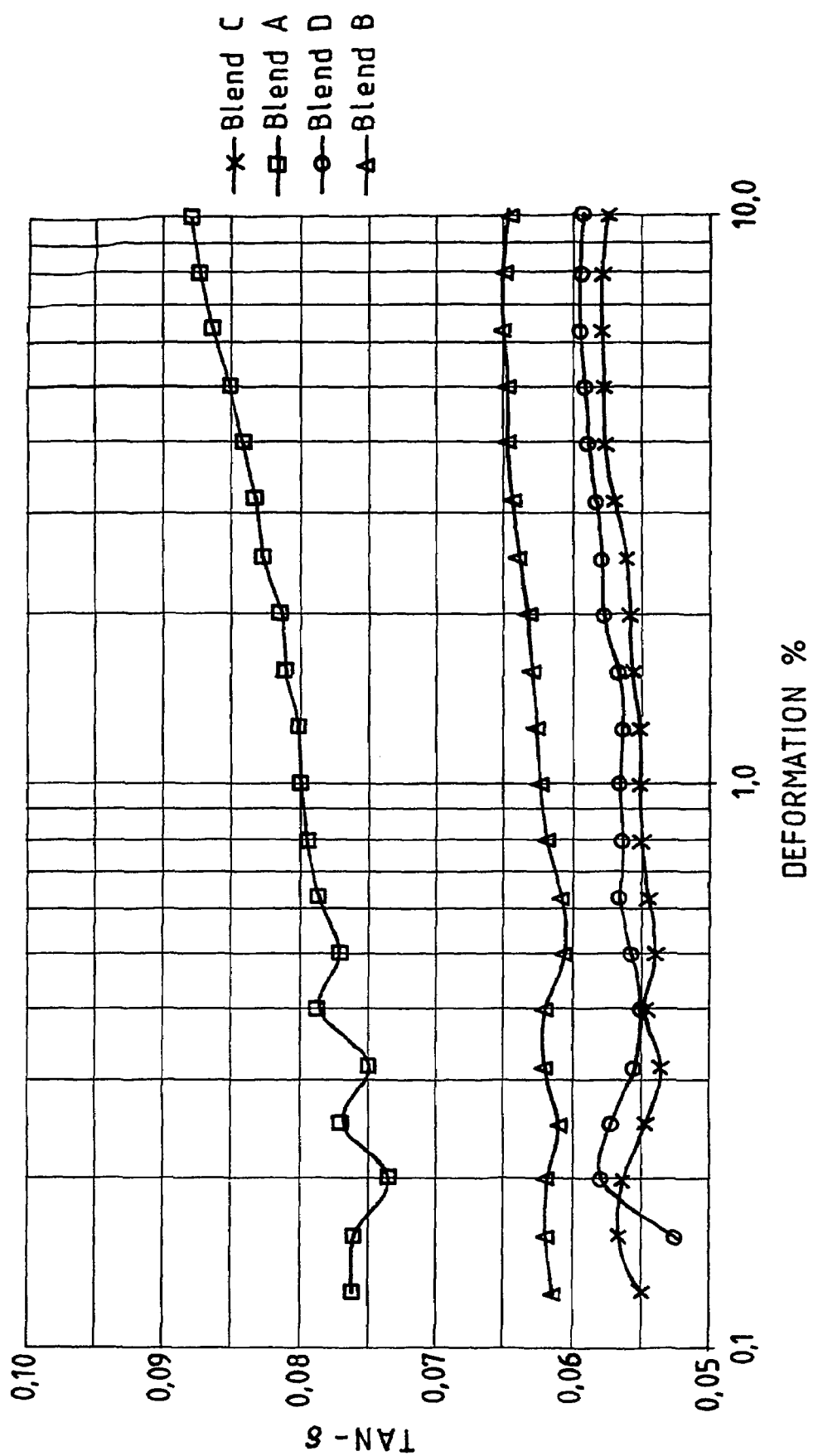

ELASTOMERIC COMPOSITION COMPRISING A FUNCTIONALIZED ELASTOMER

The present invention relates to an elastomeric composition comprising a functionalized elastomer, useful for the preparation of tyre treads.

In the use of elastomers in the formulation of blends for tyres, the availability of vulcanized products is required characterized by low hysteresis to reduce fuel consumption.

When carbon black is present as filler in formulations, the interaction between the latter and the elastomer is sufficient to guarantee excellent elasticity. When, on the other hand, silica is present as filler (light blends), the interaction between silica and elastomer is practically absent with a consequent loss of elastic response and an increase in rolling resistance.

In order to solve this problem, numerous studies have been effected on the use of silica as filler. These have produced good results in the presence of polar elastomers such as nitrilic rubber or chloroprene, in whose presence vulcanized products are obtained with good tensile properties and wear resistance.

The use of silica, on the contrary, for reinforcing elastomers with a low polarity, such as styrene-butadiene copolymers or polybutadiene, is hindered by the poor mechanical properties obtained with these elastomers.

Attempts have been made to overcome these drawbacks by using, in the compounding phase, particular organo-silanes containing sulfur, so-called mercaptosilanes (EP-A-447,066), or by using pretreated silica.

Both these solutions are onerous due to the cost of these mercaptosilanes and have the disadvantage of requiring particular precautions during handling, modification in situ and the vulcanization of the above blends.

An elastomeric composition has now been found which is useful for the preparation of blends for tyres, which overcomes the drawbacks described above.

In accordance with this, the present invention relates to an elastomeric composition vulcanizable with sulfur and/or sulfur donors useful for the preparation of tyres, which comprises:

a) 100 parts of an elastomeric mixture comprising from 20 to 100% by weight, preferably from 60 to 100% by weight, of a functionalized elastomer (a1), from 0 to 80% by weight of a non-functionalized elastomer (a2) selected from monovinylarene-conjugated diene statistic copolymers, natural rubber, polybutadiene:
b) from 10 to 150 parts of silica per 100 parts of (a);
c) from 0 to 150 parts of carbon black per 100 parts of (a);

the above elastomeric composition being characterized in that the functionalized elastomer (a1) is the reaction product between an elastomer, selected from monovinylarene-conjugated diene statistic copolymers, natural rubber, polybutadiene, with an acrylate having general formula (I)

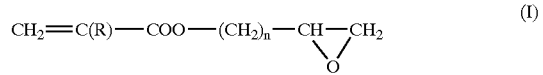

$$CH_2=C(R)-COO-(CH_2)_n-CH-CH_2 \atop \diagdown O \diagup \qquad (I)$$

wherein R is selected from H and $CH_3$, R is preferably $CH_3$, n is an integer from 0 to 4, preferably n=1.

The monovinylarene contains from 8 to 20 carbon atoms per molecule; alkyl, cyclo-alkyl, aryl substituents may be present. Typical examples of monovinylarenes are: styrene, α-methylstyrene, 3-methylstyrene, 4-n-propylstyrene, 4-cyclohexylstyrene, 4-dodecylstyrene, 2-ethyl-4-benzylstyrene, 4-p-tolylstyrene, 4-(4-phenyl-n-butyl)styrene, 1-vinylnaphthalene, 2-vinylnaphthalene. In the preferred embodiment, the monovinylarene is styrene.

Conjugated dienes which can be used for the preparation of the monovinylarene/conjugated diene elastomer contain from 4 to 12 carbon atoms per molecule, preferably from 4 to 8.

Examples of these monomers are: 1,3-butadiene, chloroprene, isoprene, 2,3-dimethyl-1,3-butadiene and relative mixtures. Isoprene and 1,3-butadiene are preferred, 1,3-butadiene is even more preferred.

The weight ratio between vinylarene and conjugated diene ranges from 10/90 to 40/60.

The monovinylarene-conjugated diene statistic elastomer can be produced according to the well-known live anionic polymerization technique, using organic compounds of alkaline metals in an inert solvent, as initiators. Typical inert solvents are pentane, hexane, cyclohexane, benzene, etc; preferably cyclohexane/hexane mixtures.

The molecular weight of the above monovinylarene-conjugated diene statistic elastomer ranges from 100,000 to 3,000,000, preferably from 200,000 to 500,000. The Mooney viscosity ($ML_{1+4}$ at 100° C.) ranges from 20 to 150, lower viscosities cause insufficient abrasion resistance and higher viscosities create processability problems.

As copolymerization initiator of the conjugated diene and vinylarene, n-butyl lithium, sec-butyl lithium, t-butyl lithium, 1,4-dilithium butane, dilithiumalkylene, phenyl lithium, diisopropenyl benzene dilithium, sodium naphthenate, lithium naphthenate, can be mentioned.

In the preparation of the copolymer, a Lewis base can be used as randomizing agent and micro-structure regulator of the diene. Typical examples of the above Lewis bases are ethers and tertiary amines, for example dimethoxybenzene, tetrahydrofuran, dimethoxyethane, diethyleneglycol dibutylether, diethyleneglycol dimethylether, triethylamine, pyridine, N-methyl morpholine, N,N,N',N'-tetramethylethylenediamine.

The content of monovinylarene bound to the polymer is controlled by means of the quantity of monomer present in the initial mixture, whereas the statistic distribution of the monovinylarene is obtained by the action of the Lewis bases mentioned above.

When 1,3-butadiene is used as conjugated diene, the 1,2 unit content of the butadiene in the copolymer can be controlled by varying the polymerization temperature. In any case, the vinyl content in the copolymer must range, with reference to the butadiene part, from 10 to 70%.

The polymerization temperature usually ranges from –120° C. to +150° C., preferably from –80° C. to +120° C., and the copolymerization time ranges from 5 minutes to 24 hours, preferably from 10 minutes to 10 hours. The concentration of monomers in the solvent normally ranges from 5 to 30% by weight, preferably from 10 to 35% by weight.

In the preferred embodiment of the present invention, the functionalized elastomer (a1) is the reaction product between an SBR copolymer and glycidylmethacrylate, i.e. the compound having general formula (I) wherein n=1, R=$CH_3$.

The elastomeric composition of the present invention may contain various quantities of functionalized elastomer (a1) and non-functionalized elastomer (a2), provided that the presence of (a1) is at least 20% by weight, preferably at least 60% by weight, with respect to the sum of (a1)+(a2). In the most preferred embodiment, the elastomeric composition essentially consists of (a1) alone.

The functionalized elastomer (a1) is prepared by reaction of the elastomer (selected from monovinylarene-conjugated diene statistic copolymers, natural rubber, polybutadiene), with an acrylate having general formula (I). The reaction is preferably carried out in mass, i.e. without solvents, at a temperature ranging from 60° to 200° C., preferably from 80° C. to 120° C. The reaction trend can be followed by observing the increase in viscosity of the reaction mass. Indicatively, at 100° C., the reaction time is approximately a few minutes, for example from 0.6 to 10 minutes.

The weight ratio between non-functionalized elastomer and acrylate having general formula (I) ranges from 100/0.5 to 100/10, preferably from 100/1 to 100/6, even more preferably from 100/1.5 to 100/3.

The quantity of silica contained in the elastomeric composition of the present invention ranges from 10 to 150 parts, preferably from 10 to 80 parts, even more preferably from 30 to 60 parts, per 100 parts of elastomeric material (a). When the silica content is less than 10 parts, the reinforcing effect is insufficient and the wear resistance is poor; on the other hand, when it exceeds 150 parts, the processability and tensile properties are limited. In the preferred embodiment, the silica has a BET surface ranging from 100 to 250 m$^2$/g.

In addition 0–150 parts of carbon black can be used as filler together with the silica.

The elastomeric composition of the present invention, i.e. (a)+(b) and (c), can be vulcanized according to the usual techniques well known to experts in the field, i.e. with sulfur and/or sulfur donors, accelerating systems and activators.

The blends may also contain other types of compounds, such as antioxidants, anti-ozone agents, plasticizers, processing aids, as well as fillers in the form of powders, such as calcium carbonate, silicates, fibrous fillers such as glass fibre, carbon fibres, etc.

The blends are preferably prepared using internal mixers, for example of the Banbury type.

The vulcanization temperature ranges from 130° C. to 180° C., preferably from 140° C. to 170° C.

The vulcanized products thus obtained have tensile properties and rolling resistance entirely comparable with the best light blends currently obtainable. These properties make the above vulcanized products suitable for use as tyre treads.

The following examples are provided for a better understanding of the present invention.

EXAMPLE 1

Preparation of the Functionalized Elastomer 100 parts of SSBR 72613 rubber (styrene-butadiene rubber prepared in solution) and 2 phr of glycidyl methacrylate are charged into a closed mixer (Brabender) operating at 100° C. and 50 rpm; the mixture is maintained under these conditions for an overall time of 8 minutes.

The elastomer thus functionalized is recovered from the mixer and used in the preparation of the blends.

The fact that the glycidyl methacrylate has reacted with the SSBR rubber is sustained by the considerable increase in the Mooney viscosity (see the Mooney viscosity in Table 2 of sample D with respect to the comparative sample A).

Preparation of the Blends and Relative Vulcanization

Silica and other materials typical for the preparation of tyre treads are added to the elastomers, both comparative and that of the present invention. The above blends are prepared using a laboratory internal mixer of the Banbury type and two-step blending cycles: the first, for the incorporation of silica or compounds containing Silicon, is carried out in a Banbury mixer; the second, for the addition of the vulcanizing system, is effected in an open mixer. The total blending time is 10 minutes, the temperature about 80° C.

The test-samples for determining the mechanical, dynamic and dynamo-mechanical properties were vulcanized in a press at 151° C. for 45 minutes.

The composition of the blends is indicated in Table 1.

TABLE 1

| | BLENDS | | | |
|---|---|---|---|---|
| | A | B | C | D |
| Mod. SSBR | — | — | — | 100 |
| SSBR | 100 | 100 | 100 | — |
| Silica (phr) | 28.57 | 28.57 | — | 28.57 |
| Si 69 (phr) | — | 2.29 | — | — |
| Coupsil 8113 (phr) | — | — | 31.48 | — |
| Sulfur (phr) | 1.8 | 1.8 | 1.8 | 1.8 |
| DPG (phr) | 0.6 | 0.6 | 0.6 | 0.6 |
| MBTS (phr) | 1.6 | 1.6 | 1.6 | 1.6 |

The characteristics of the SSBR used are as follows:

Styrene: 25% by weight, Vinyl: 64%; ML Viscosity (1+4): 60; T$_g$=−20° C.

The abbreviation DPG corresponds to N,N'-Diphenylguanidine (accelerating agent).

The abbreviation MBTS corresponds to 2,2'-Dibenzothiazyl disulfide (accelerating agent).

The abbreviation Si 69 (Degussa) corresponds to Bis(3-triethoxysilylpropyltetrasulfide).

The abbreviation Coupsil 8113 (Degussa) corresponds to precipitated silica (of the VN$_3$ type, surface area measured with nitrogen=175 m$^2$/g) silanized with Si69.

The characteristics of the blends thus prepared are indicated in Table 2.

TABLE 2

| TEST | Blend A | Blend B | Blend C | Blend D |
|---|---|---|---|---|
| Mod. 50 | 1.39 MPa | 1.5 MPa | 1.68 MPa | 1.66 MPa |
| Mod. 100 | 2.09 MPa | 3.01 MPa | 3.73 MPa | 3.22 MPa |
| Mod. 150 | 2.92 MPa | 5.31 MPa | 6.73 MPa | 5.33 MPa |
| Mod. 200 | 3.89 MPa | 7.75 MPa | — | 7.92 MPa |
| Mod. 250 | 5.01 MPa | — | — | — |
| Mod. 300 | 6.31 MPa | — | — | — |
| Ult. tens. strength | 11.21 MPa | 8.9 MPa | 8.89 MPa | 9.05 MPa |
| Ult. elongation | 437 MJ/m$^3$ | 208 MJ/m$^3$ | 181 MJ/m$^3$ | 219 MJ/m$^3$ |
| Mooney | 67.9 M.U. | 120.9 M.U. | 128.4 M.U. | 131 |
| Abrasion* | 185 mm$^3$ | 155 mm$^3$ | 128.4 mm$^3$ | 131 mm$^3$ |

*Effected with 1 Kg of fixed test-sample

As can be seen from the above data, the blend prepared with the functionalized elastomer (sample D) has properties which are very similar to those of the comparative blends (B and C) prepared with silane additive and functionalized silica, respectively. This behaviour, typical of a reinforced rubber, is absent in the comparative sample A, where there is no valid interaction between rubber and silica.

In sample D, there is a considerable improvement in the abrasion resistance, as is also observed in samples B and C.

FIG. 1 indicates the curves relating to Tan δ at 60° and 10 Hz, in relation to the deformation. As is known, Tan δ is a hysteresis indicator: the lower the Tan δ, the lower the hysteresis.

In particular, the Tan δ value at 60° and 10 Hz at 5% deformation is used as an indicator of the Rolling Resistance.

In the graph of FIG. 1 enclosed, it can be seen how the Tan δ trend of blend D, containing silica+GMA is very similar to that of the blends containing silica+silane (B) and silanized silica (C), whereas it is distinctly different from the blend without additives (A). The Rolling Resistance indicator of blend D shows an improvement of about 25% with respect to blend A.

The invention claimed is:

1. An elastomeric composition vulcanizable with at least one selected from the group consisting of sulfur and sulfur donors useful for the preparation of tyres, which comprises:
   a) 100 parts of an elastomeric mixture comprising from 20 to 100% by weight of a functionalized elastomer (a1), from 0 to 80% by weight of a non-functionalized elastomer (a2) selected from the group consisting of monovinylarene-conjugated diene statistical copolymers, natural rubber, polybutadiene and mixtures thereof:
   b) from 10 to 150 parts of silica per 100 parts of (a);
   c) from 0 to 150 parts of carbon black per 100 parts of (a);
   the above elastomeric composition being characterized in that the functionalized elastomer (a1) is the reaction product between an elastomer, selected from the group consisting of monovinylarene-conjugated diene statistical copolymers, natural rubber, polybutadiene and mixtures thereof, with an acrylate having general formula (I)

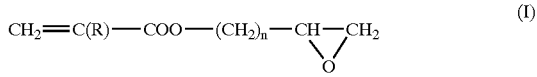

wherein R is selected from H and CH₃, n is an integer from 0 to 4.

2. The elastomeric composition according to claim 1, characterized in that in the compound having general formula (I) n=1 and R is CH₃.

3. The elastomeric composition according to claim 1, characterized in that the presence of (a1) is at least 60% by weight with respect to the sum of (a1)+(a2).

4. The elastomeric composition according to claim 1, characterized in that the elastomeric mixture essentially consists of 100% of functionalized elastomer (a1).

5. The elastomeric composition according to claim 1, characterized in that the functionalized elastomer (a1) is prepared by the reaction of a monovinylarene-conjugated diene statistic copolymer with an acrylate having general formula (I).

6. The elastomeric composition according to claim 5, characterized in that the monovinylarene-conjugated diene statistic copolymer is a styrene-butadiene statistical copolymer.

7. The elastomeric composition according to claim 1, characterized in that the reaction between the non-functionalized elastomer and acrylate having general formula (I) is effected in mass, without solvents, at a temperature ranging from 60° to 200° C.

8. The elastomeric composition according to claim 7, characterized in that the reaction between the non-functionalized elastomer and acrylate having general formula (I) is effected in mass, without solvents, at a temperature ranging from 80° to 120° C.

9. The elastomeric composition according to claim 1, wherein the weight ratio between non-functionalized elastomer and acrylate having general formula (I) ranges from 100/0.5 to 100/10.

10. The elastomeric composition according to claim 1, wherein the weight ratio between non-functionalized elastomer and acrylate having general formula (I) ranges from 100/1 to 100/6.

11. The elastomeric composition according to claim 1, wherein the weight ratio between non-functionalized elastomer and acrylate having general formula (I) ranges from 100/1.5 to 100/3.

12. An elastomeric composition vulcanizable with at least one selected from the group consisting of sulfur and sulfur donors useful for the preparation of tyres, which comprises:
   a) 100 parts of an elastomeric mixture comprising from 20 to 100% by weight of a functionalized elastomer (a1), from 0 to 80% by weight of a non-functionalized elastomer (a2) selected from the group consisting of monovinylarene-conjugated diene statistical copolymers, natural rubber, polybutadiene and mixtures thereof:
   b) from 10 to 150 parts of silica per 100 parts of(a);
   the above elastomeric composition being characterized in that the functionalized elastomer (a1) is the reaction product between an elastomer, selected from the group consisting of monovinylarene-conjugated diene statistical copolymers wherein the weight ratio between vinylarene and conjugated diene ranges from 10/90 to 40/60, the molecular weight of the monovinylarene conjugated diene statistic elastomer ranges from 100,000 to 3,000,000, the Mooney viscosity as measured by $ML_{1+4}$ at 100° C. ranges from 20 to 150 and the vinyl content in the copolymer ranges from 10 to 70 with respect to butadiene, natural rubber, polybutadiene and mixtures thereof, with an acrylate having general formula (I)

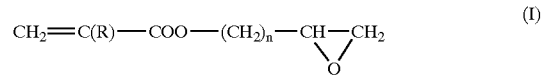

wherein R is selected from H and CH3, n is an integer from 0 to 4 and the weight ratio between non-functionalized elastomer (a2) and acrylate having general formula (I) ranges from 100/0.5 to 100/10.

13. An article comprising the elastomeric composition of claim 1.

14. The article as claimed in claim 13 wherein said article is a tyre.

15. A method for producing a tyre comprising adding the elastomer composition as claimed in claim 1 to a tyre formulation.

16. An article comprising the elastomeric composition of claim 12.

17. The article as claimed in claim 16 wherein said article is a tyre.

18. A method for producing a tyre comprising adding the elastomer composition as claimed in claim 12 to a tyre formulation.

* * * * *

UNITED STATES PATENT AND TRADEMARK OFFICE
CERTIFICATE OF CORRECTION

| | | |
|---|---|---|
| PATENT NO. | : 7,015,277 B2 | |
| APPLICATION NO. | : 10/416167 | |
| DATED | : March 21, 2006 | |
| INVENTOR(S) | : Biggi | |

It is certified that error appears in the above-identified patent and that said Letters Patent is hereby corrected as shown below:

On the title page, Items (12) and (75), the Inventors' information is incorrect. Items (12) and (75) should read:

-- (12)  United States Patent
       Biggi et al. --

-- (75) Inventors: Aroldo Biggi, deceased, late of
San Donato Milanese (IT); by
Orsola Casaburo, legal representative,
San Donato Milanese (IT); by
Lisa Biggi, legal representative,
San Donato Milanese (IT);
Cristina Arcoleo, Opera (IT);
Luca Vitalini Sacconi, Ferrara (IT) --

Signed and Sealed this

Third Day of June, 2008

JON W. DUDAS
*Director of the United States Patent and Trademark Office*